United States Patent [19]
Waterloo

[11] 3,753,639
[45] Aug. 21, 1973

[54] BLOW MOLDING DIE
[75] Inventor: William C. Waterloo, York, Pa.
[73] Assignee: Graham Engineering Corporation, York, Pa.
[22] Filed: Mar. 12, 1971
[21] Appl. No.: 123,596

[52] U.S. Cl. .............................................. 425/387
[51] Int. Cl. ............................................ B28b 11/08
[58] Field of Search ..................... 425/326 B, 387 B, 425/215, 242, 247, 342, 389, 405

[56] References Cited
UNITED STATES PATENTS
3,209,401  10/1965  Mehnert ........................ 425/387 B
3,424,829  1/1969   Peters et al. .................. 425/387 B
3,619,857  11/1971  Gilbert .......................... 425/387 B Primary Examiner—Robert D. Baldwin
Assistant Examiner—Brian P. Ross
Attorney—C. Hercus Just

[57] ABSTRACT

Dies for forming hollow articles by blowing into a plasticated synthetic resin parison in a mold cavity formed in a pair of supplementary dies which are provided with means operable adjacent one end of the die cavities to force a limited amount of the parison toward one end of the mold cavity to insure the forming in one end of a hollow molded article a seam produced by pinching one end of a section of the parison from the oncoming supply thereof in such manner that the seam has a thickness no less than that of the portions of the article adjacent said seam.

3 Claims, 5 Drawing Figures

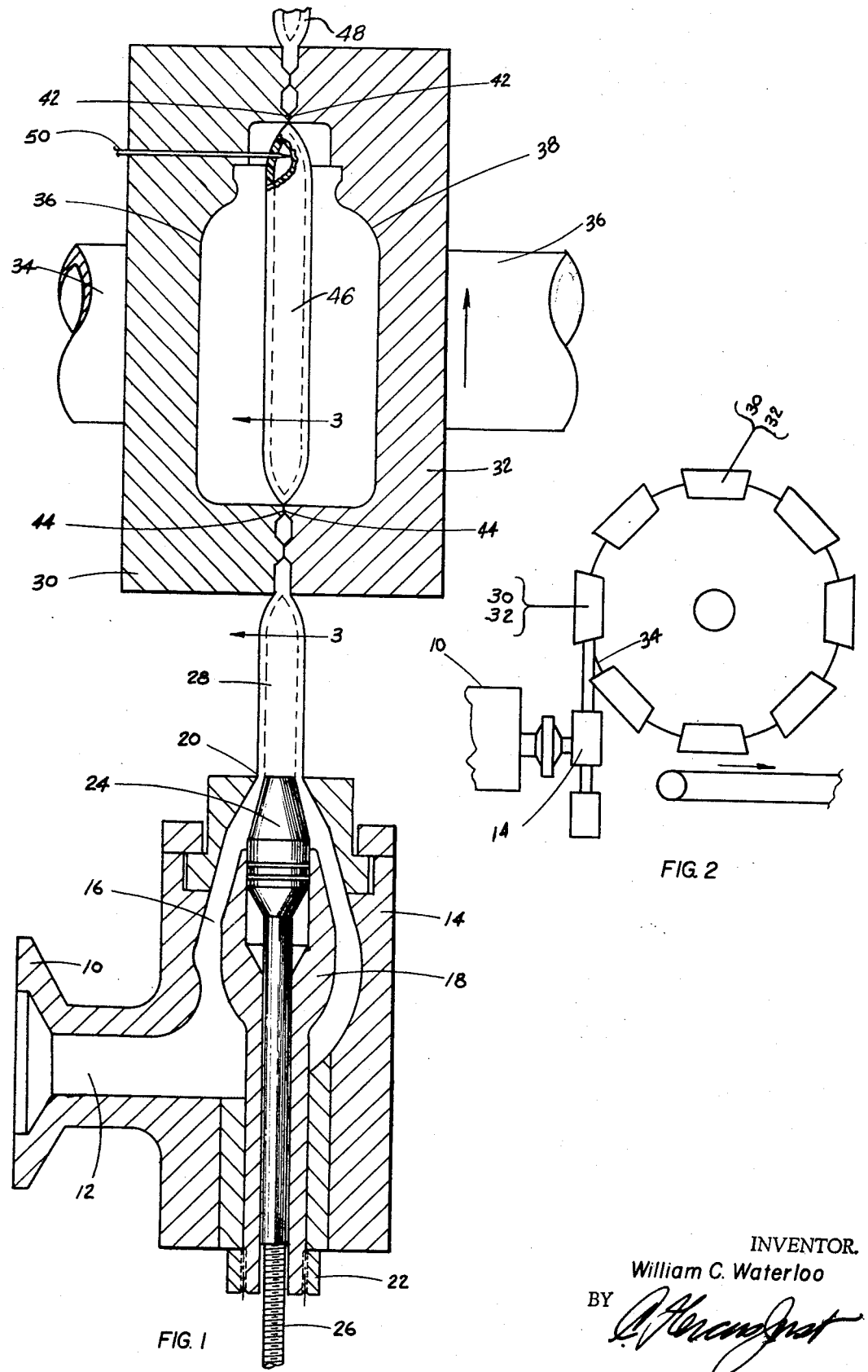

INVENTOR.
William C. Waterloo
BY
ATTORNEY

BLOW MOLDING DIE

BACKGROUND OF THE INVENTION

The formation of hollow articles, such as containers, from thermoplastic synthetic resin by the formation of a parison which, in plasticated condition, is capable of being enclosed between a pair of mold dies while injecting air or other suitable gas into a section of the parison, which is sealed at opposite ends, so as to expand the parison into conformity with the die cavity walls, is widely practiced. In such procedure, the parison progressively moves from a parison-forming head for introduction between said pair of molding dies while the dies also are moving in the direction of the parison during the time the segregated section of the parison is being blown as aforesaid to form containers, such as jars or the like, which have a bottom. During the foregoing procedure, the bottom of the container is formed adjacent one end of the segregated portions of the parison which is pinched from the oncoming, continuously-formed parison.

Said pinched end of the parison forms a seam, for example, in said bottom of a container when formed by the foregoing procedure. However, incident to said section of the parison being pinched from the oncoming continuously formed parison, there is a tendency for said pinched end of said section of the parison to be noticably thinner along the pinched line which ultimately forms the seam in the aforementioned bottom of such container, whereby along said seam, the bottom is not as thick as the adjacent portions of the bottom of such a container. This is an undesirable characteristic of containers formed by such means in that it presents a line of weakness.

Thus far, no ready solution has been found for avoiding the aforementioned tendency other than to increase the thickness of the wall sections of the parison which are to form such bottom of the container, whereby at least the thinned portion of the resulting bottom along said seam will be adequate to withstand maximum stresses to which the container is intended to be subjected. Obviously, this requires providing a thickness of resin in the bottom of such container in excess of that which normally would be required if, for example, the seam were of equal thickness to that of the portions of the bottom of the container adjacent said seam.

In order to obviate the foregoing difficulty, it is the principal object of the present invention to provide means on the molding dies which are operable to force a relatively small additional amount of the parison toward the portion thereof which is pinched that ultimately forms the seam in a transverse end wall, such as the bottom of a container, so as to provide at least equal thickness along said seam as in the portions of the transverse wall adjacent the seam.

It is another object of the invention to provide transversely extending bars respectively upon the plurality of mold dies adjacent the rim means of the die cavities which form such transverse end wall upon a hollow molded resin article, said ribs being operable to squeeze and thereby force an adjacent portion of the parison which is immediately exterior of the die cavity toward said adjacent rim means and thereby increase the volume of resin which is pinched by said rim means so as to be adequate to provide said desired thickness of seam portion in said transverse wall of a molded article.

It is a further object of the invention to form said transverse ribs on said dies with a squeezing or pinching surface that is wider than the adjacent rim means of the die in order to insure the forcing of an adequate amount of resin from the parison toward that portion thereof which is pinched by said rim means and thereby ensure an adequate thickness of seam in said transverse wall at one end of a molded article formed by said die.

Further, other and additional objects of the invention will become apparent from the summary, detailed description, claims and drawings which follow hereinafter.

BRIEF SUMMARY OF THE INVENTION

The principal improvement aspect of the invention in contrast to conventional molding dies employed in blown-in-the-mold types of molding machine for forming hollow articles from plasticated synthetic resin is the realization of the fact that when rim means at opposite ends of molding die cavities simultaneously pinch longitudinally spaced portions of a plasticated synthetic resin parison, a seam will be formed when the parison is blown into conformity with the molding cavity of the dies and if one of said pinched portion comprises a transverse wall of a hollow container, for example, said wall will be thinner along the line of said seam than the adjacent portions of the wall but said difficulty may be obviated by simultaneously modifying the amount of plastic adjacent the rim members of the die cavities which effects such pinching so that a slightly greater amount of plastics than otherwise would be provided is forced between said rim members as they are closing upon each other to effect the segregation of said section of parison from the oncoming tubular supply thereof.

One effective means for furnishing such slightly additional volume of resin to the segregated section of parison which has been pinched from the oncoming supply thereof comprises the provision of a transversely extending rib on each of the mold sections adjacent the trailing ends thereof and in slightly spaced relation to the adjacent rim means of the die cavities, whereby the closing of the dies brings the opposing ribs into squeezing relationship with opposite sides of the portion of the parison which is immediately exterior of the die cavities and thereby forces a limited amount of said parison between said adjacent rim means of the die cavities while they are closing toward each other so as to provide the aforementioned slightly additional amount of resin which is necessary to avoid the customary difficulties described above.

In order to render the transverse ribs effective, they should be of a length at least equal to the width of the parison when compressed between the opposing ribs respectively on the dies, in addition to having a width in a direction parallel to the axis of the parison which is greater than the corresponding width of the adjacent rim means of the die cavities in order to effect the desired degree of squeezing of said parison.

The foregoing features and characteristics of the invention which comprise additions to conventional molding dies and the method of operating the same to form hollow articles in which any seams in transverse walls thereof are at least equal in thickness to the adjacent portion of said walls are set forth in the following detailed description, claims and drawings.

DESCRIPTION OF THE DRAWINGS

FIG. 1 is an exemplary vertical sectional elevation showing a parison head operable to discharge a parison upwardly for disposition between molding dies which embody the principles of the invention.

FIG. 2 is a small scale diagrammatic side elevation view of the parison extruder head and Ferris wheel on which the molds are mounted to illustrate the relative positions of these elements in accordance with the invention.

DETAILED DESCRIPTION

Figure 3:
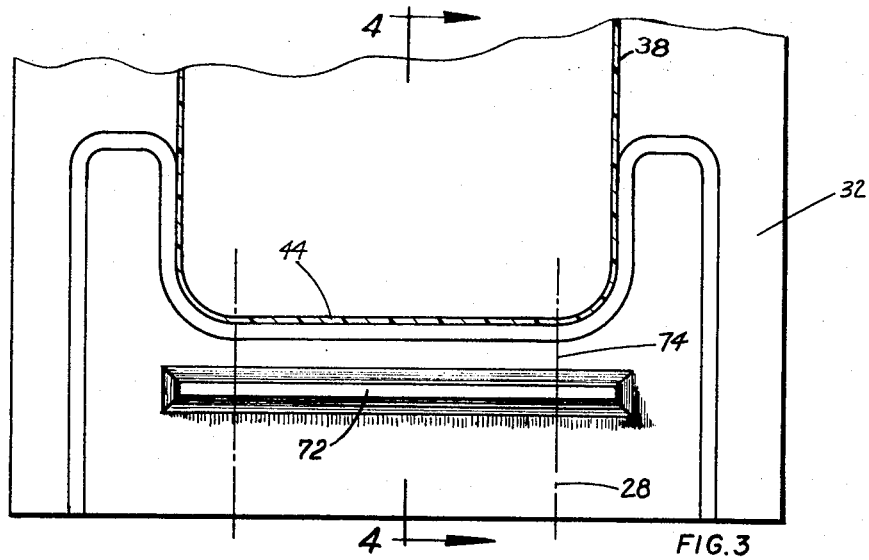
FIG. 3 is a larger scale fragmentary elevation of one face of a molding die as seen on the line 3—3 of FIG. 1.

Referring to FIG. 1, the delivery end of an extruder 10 is illustrated fragmentarily. Said extruder plasticates and homogenizes synthetic resin of desired composition and discharges the same at a substantially uniform rate through inlet opening 12 in the parison head 14. The parison head is provided with an internal cavity 16 within which a mandrel 18 is mounted to control the flow rate of resin delivered to the discharge end 20 of the parison head 14. In accordance with customary construction, the mandrel 18 is adjustable longitudinally a limited amount within the internal cavity 16 when the mold system is being set up for a given run, by a diagrammatically illustrated adjusting nut 22. Longitudinally movable within the mandrel 18 is a die pin 24 which moves cyclically in opposite directions by a control means, not shown, connected to the projecting end 26 of the die pin 24. Such cyclical movement of the end of the die pin adjacent the discharge end 20 of the parison head is programmed to control the contour of the parison 28 which is progressively discharged from the parison head 14 for disposition between successive pairs of molding dies 30 and 32.

In the exemplary illustration of the molding mechanism shown in FIG. 1, it will be seen that the parison 28 is discharged substantially vertically upward due to the fact that the molding dies 30 and 32 also move upward after the same have been moved transversely into abutment with each other so as to enclose a section of the parison therebetween. The molding dies 30 and 32 are movable toward and away from each other by mechanism, not shown, which is connected to the supporting bars 34 and 36 which represent the supporting and actuating means for the molding dies in exemplary manner.

A plurality of pairs of such molding dies 30 and 32 are shown mounted on an examplary Ferris wheel 34, the arrangement of which with respect to the extruder 10 and parison head 14 being shown in small scale in exemplary manner in FIG. 2. The direction of rotation thereof also is illustrated by directional arrows shown in said figure whereby it will be seen that the delivery of the parison from the head 14 will be engaged by the pair of mold-ing dies 30 and 32 immediately above the same while moving substantially in a vertical direction. While they are so moving, they respectively are moved toward each other to enclose a section of the parison 28 therebetween for subsequent molding of a hollow article therefrom by the following means and method.

In FIG. 1, the molding dies 30 and 32 are shown to have supplementary cavities 36 and 38 therein which, as illustrated, are substantially mirror images of each other, whereby they supplement each other to form a single mold cavity 40. The upper and lower ends of the die cavities 36 and 38 respectively are provided with cooperating rim means 42 and 44 which function to pinch a section 46 of predetermined length of the parison 28 and thereby seal the opposite ends of said section, as well as provide a breaking point for separation of waste sections of the parison such as section 48 from the completely molded object.

Immediately upon the closing of the molding dies 30 and 32 upon the section 46 of the parison, a blow needle 50 pierces the segregated section 46 and instantly inflates it while the parison is in a substantially vertical position. Due to the fact that the parison is approximately at its melting point, if not a few degrees above it at this stage, it is sufficiently plasticated that it will evenly expand transversely into conformity with all surfaces of the die cavities 36 and 38, whereupon the hollow article thus formed has walls of substantially uniform thickness and commences to be chilled by the controlled temperature of the molding dies 30 and 32.

While the foregoing description includes certain features of novelty which are described and claimed in said aforementioned related applications, the details thus far described pertain to the present invention only in a general way. The principal features and characteristics of the invention are set forth as follows.

Figure 5:
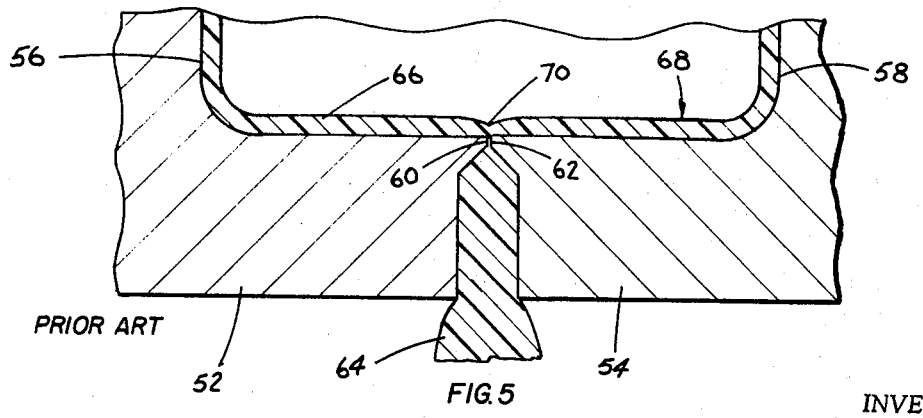
FIG. 5 is a view similar to FIG. 4 but illustrating corresponding sections of conventional molding dies and showing in section the inherent deficiency in a molded article produced thereby.

Referring to FIG. 5, there is shown an exemplary fragmentary sectional elevation of the lower portions of a pair of conventional dies employed in existing blow molding machines. In said figure, the molding dies 52 and 54 have cavities 56 and 58 which also are of conventional nature. The lower portions of the molding cavities 56 and 58 terminate in tapered rim means 60 and 62 which pinch the parison 64 incident to closing one end of a segregated section of the parison, similar to section 28 illustrated in FIG. 1, immediately prior to the segregated section of the parison being inflated into molded engagement with the molding cavities 56 and 58.

It is known that when a parison is pinched by conventional rim means 60 and 62 of the type generally illustrated in FIG. 5, there is a tendency for part of the resin to be drawn away from the inner surface of the molded wall 66 of the hollow article 68 and thereby form a linear depression 70 which extends diametrically across said wall 66 between opposite side walls of the hollow article 68, in the form of a groove. When the waste portion of the parison 64 is separated from the molded wall 66 at the completion of molding of the hollow article 68, it will be seen that the diametrical portion of the molded wall along the groove or linear depression 70 comprises a weakness therein. In view of the inherent formation of such a groove, it is customary to supplement the strength of the molded wall 66 by increasing the thickness thereof to such extent that the portion of said wall in the vicinity of the depression 70 will be sufficiently strong to withstand any stresses to which the molded article is intended to be subjected. This results in using excess raw material and also frequently produced bubble-like formations at the end of the groove or seam.

Figure 4:
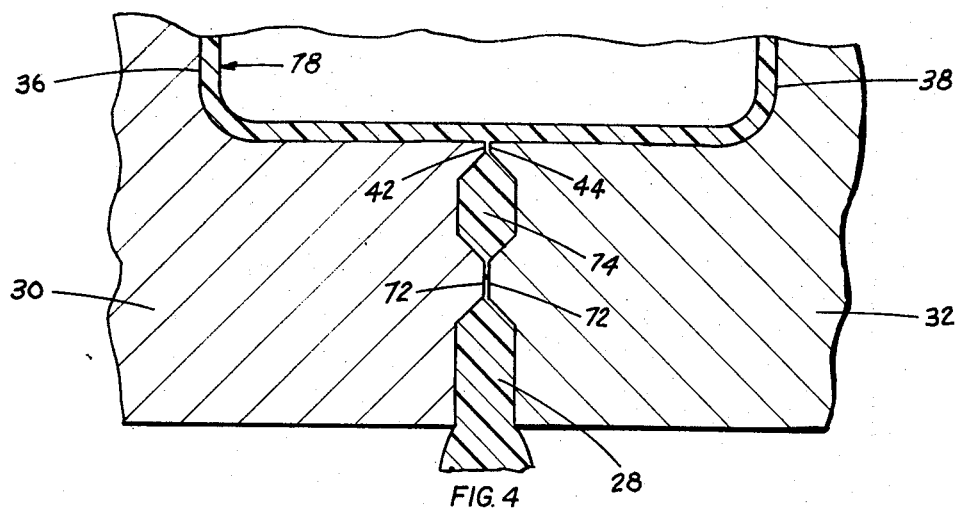
FIG. 4 is a fragmentary vertical sectional view of a pair of cooperating molding die sections generally as seen on the line 4—4 of FIG. 3 and illustrating on a larger scale than in FIG. 1 details of the invention.

The present invention obviates the aforementioned difficulty which is inherent in products produced by molding dies in the type shown in FIG. 5 by providing what is referred to as a mold dam arrangement, details of which are best shown in FIGS. 3 and 4 due to the larger size of the scale therein as compared with that of FIG. 1. Said dam means comprises a pair of ribs 72 which respectively are provided on the adjacent faces of molding dies 30 and 32. Said ribs are parallel to and spaced a short distance below the rim means 44 on said end of said molding dies. It will be seen that the operative faces of the ribs 72 also are appreciably wider than the rim means 44.

When the molding dies 30 and 32 are brought together to encircle the section 46 of the parison 28, the ribs 72 will engage and compress a predetermined length of the parison 28 to segregate a short section 74 of the parison resin within transversely extending cavities in the dies between the ribs 72 and the rim means 44 which is substantially solid resin devoid of any entrapped air, as can seen from FIG. 4. In doing so, a portion of the segregated short section 74 will be forced through the space between the rim means 44, before they close to their full extent, whereby a small amount of additional resin is available to be forced into the transverse wall 76 of a molded hollow object 78 in such manner that said transverse wall 76 will be of substantially uniform thickness over the entire area thereof, including the area which is immediately above the rim means 44, assuming that said wall is designed to have overall uniform thickness.

From the foregoing, it will be seen that by forcing a slight amount of additional plasticated resin upwardly from the ribs 72 during the closing of the molding dies upon each other, it is possible to conserve the additional amount of resin which heretofore has been required to produce a transverse wall in a molded hollow article of adequate strength in accordance with the procedure described above with respect to FIG. 5, whereby in accordance with the present invention, the transverse wall 76 shown in FIG. 4 need have no greater thickness than that of the sidewalls of the molded hollow object 78, for example, unless greater thickness is so desired. Thus, a small but noticable saving in raw material is possible by utilizing the present invention in the formation of hollow molded resin articles having transverse walls in at least one end thereof, or similar structure, in regard to the making of which the present invention may be employed.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. Dies for forming hollow articles from synthetic resin by positioning a plasticated resin parison between a pair of mold dies and blowing said parison internally into conformity with the cavities in said dies, said dies having cavities therein supplementary to each other to form a hollow article of desired configuration, one end portion of each cavity being adapted to form a substantially transverse wall at one end of said article, and rim means on said dies adjacent the opposite ends of said cavities therein operable to pinch a parison at spaced locations to form a sealed section thereof to be blown into conformity with said mold cavity, one of said pinched portions of said parison forming a seam across said transverse wall of articles blown in said cavities of said dies when in operative abutment, in combination with transversely extending rib means on said dies spaced from said rim means of said one end portion of each mold cavity and substantially within the plane of said rim means to define correspondingly extending narrow cavities shaped and operable when said dies are moved into abutment to force a portion of said parison into entrapment within said narrow cavities and compress it into a mass substantially devoid of cavities and force some of said mass past said rim means while the dies are closing and into said one end portion of each mold cavity to provide an adequate supplemental amount of resin at the seam in said one end of a blown molded article to produce a seam section at least as thick as the adjacent portions of said end of said articles.

2. The dies according to claim 1 in which said rib means extend transversely to the axis of said die cavity and are at least as long as the width of said parison when compressed therebetween.

3. The dies according to claim 1 in which said ribs have a width in an axial direction relative to said mold cavities greater than the width of the rim means on the mold cavity adjacent said ribs, whereby the width of said ribs is effective to compress the portion of parison engaged thereby in opposite longitudinal directions, one of which directions extends toward said adjacent rim means to provide said aforementioned adequate amount of resin.

* * * * *